May 19, 1964   E. E. REESE   3,133,304
DOUBLE LOCK WIPER BLADE CONNECTOR
Filed Oct. 25, 1961
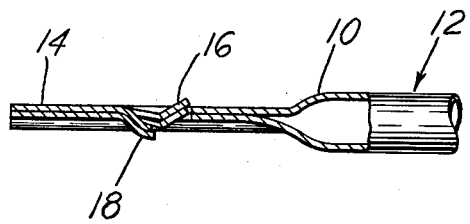
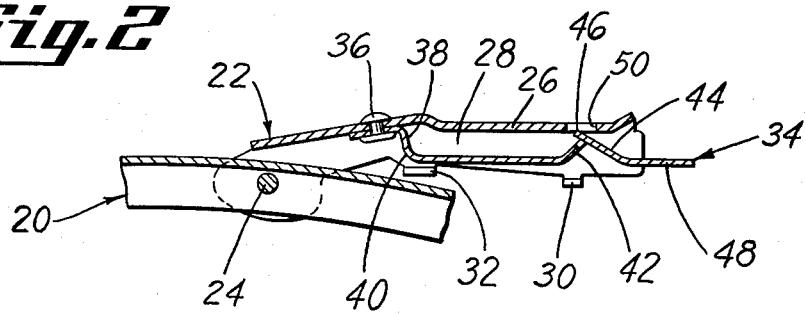
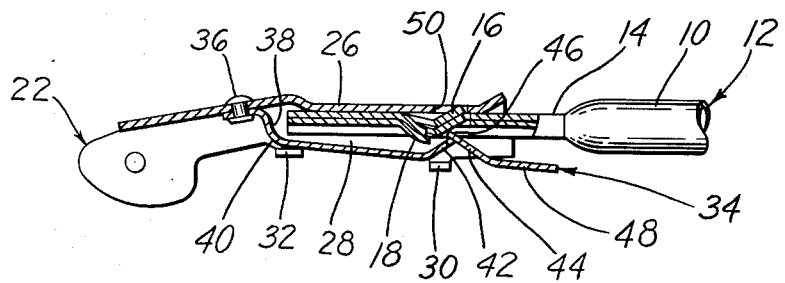
INVENTOR.
ELMER E. REESE
BY
HIS ATTORNEY

United States Patent Office 3,133,304
Patented May 19, 1964

3,133,304
DOUBLE LOCK WIPER BLADE CONNECTOR
Elmer E. Reese, Rochester, N.Y., assignor to General
Motors Corporation, Detroit, Mich., a corporation
of Delaware
Filed Oct. 25, 1961, Ser. No. 147,508
2 Claims. (Cl. 15—250.32)

This invention pertains to windshield wipers, and particularly to an improved bayonet-type connector for releasably securing a wiper arm to a wiper blade.

In recent years the majority of original equipment wiper arm to blade connections have been of the straight end bayonet-type including a channel-shaped connector body hingedly connected to the wiper blade for movement about a transverse axis, and a straight end wiper arm having a stud, or shoulder, adapted to interlock with the connector under the urge of a spring latch. One of the more common types of blade to arm connections is disclosed in the Scinta Patent No. 2,807,822, wherein the spring latch is constituted by a leaf spring member which is carried by the channel-shaped connector body. One of the problems with the use of this particular blade connector, and in general all connectors of this type, is the variation in pressure applied by the leaf spring latch, particularly in instances where the pressure of the leaf spring latch is appreciably less than the pressure of the spring which urges the arm towards the associated windshield, since the arm and blade are adapted to be disengaged by effecting pivotal movement therebetween in opposite directions so as to depress the leaf spring and disengage the stud from the aperture in the top wall of the channelled connector body.

It has been found that an accumulation of ice between the blade holder or superstructure and the connector body will result in release of the spring latch due to arm applied pressure, thus causing the wiper blade to leave the wiper arm during its oscillatory movement, which action is highly undesirable. In order to preclude the automatic separation of the arm and blade due to an accumulation of ice or other foreign material between the connector body and the blade, a double lock has been devised by one manufacturer, namely an upstruck tang in the leaf spring which engages a recess formed on the lower side of the terminal end of the arm by the projecting stud, or shoulder, on the upper surface of the terminal arm end. With this type of arrangement, while the stud can be disengaged from the aperture in the top wall of the connector body due to accumulation of ice between the connector and the blade, the tang on the leaf spring will maintain the blade and arm connected since relative pivotal movement between the leaf spring and the arm is required to disengage abutting edges, or shoulders, of the arm and the leaf spring.

The present invention relates to an improved and more reliable double lock wiper arm terminal end comprising a pair of longitudinally spaced oppositely projecting studs, or shoulders, one of which is adapted to interlock with the aperture in the top wall of the connector body, and the other of which is adapted to interlock with the tang on the leaf spring upon disengagement of the stud from the aperture in the top wall of the connector body. In order to disengage the wiper arm from the wiper blade it is necessary to manually deflect the leaf spring, thus preventing inadvertent separation of the wiper arm from the wiper blade due to an accumulation of ice or other foreign material between the connector body and the wiper blade. Accordingly, among my objects are the provision of a double lock bayonet-type connector for wiper blades; and the further provision of a wiper arm having a pair of longitudinally spaced oppositely extending shoulders adapted to engage complementary abutment means in a connector body carried by a wiper blade.

The aforementioned and other objects are accomplished in the present invention by forming a pair of longitudinally spaced oppositely extending abutments on the terminal end of the wiper arm, the outermost abutment being engageable with the spring latch, and the innermost abutment being engageable with the aperture in the top wall of the connector body. Specifically, the double lock bayonet-type terminal end wiper arm is designed for use with connectors supplied with original equipment blades to prevent inadvertent separation of the blade and the arm. Since these connectors have an aperture in the top wall of the connector body and a tang on the leaf spring in substantial alignment therewith, the improved double lock terminal end wiper arm has the outermost abutment projecting downwardly for engagement with the tang of the leaf spring, and the innermost abutment projecting upwardly for engagement with an edge in the aperture in the connector body. The improved double lock terminal end wiper arm can be readily connected with the connector body by merely inserting the end thereof between the leaf spring latch and the top wall of the connector body, and effecting relative longitudinal movement therebetween, the downwardly projecting abutment acting automatically as a cam to depress the leaf spring. However, to disengage the wiper arm from the wiper blade it is necessary to manually depress the leaf spring latch to positively disengage the downwardly projecting abutment from the tang on the leaf spring, a mere relative pivotal movement between the two parts being capable of releasing only the upwardly projecting abutment from the aperture in the connector body while the downwardly projecting abutment retains the parts in assembled relation.

Further objects and advantages of the present invention will be apparent from the following description, reference being had to the accompanying drawings, wherein a preferred embodiment of the present invention is clearly shown.

In the drawing:

FIGURE 1 is a fragmentary side view in elevation of a wiper arm having the improved double lock terminal end connector constructed according to the present invention.

FIGURE 2 is a fragmentary view, partly in section and partly in elevation, of a wiper blade having a commercially available connector.

FIGURE 3 is a fragmentary sectional view of the improved double lock wiper arm assembled with the connector of FIGURE 2.

Referring to FIGURE 1, a portion of an outer section 10 of a wiper arm 12 having spring hinge connected inner and outer sections is shown having a flat terminal end 14. The flat terminal end 14 of the outer arm section 10 is formed with a pair of substantially aligned, longitudinally spaced oppositely extending shoulders, or abutments, 16 and 18. The outermost abutment 18 projects downwardly, and the innermost abutment 16 projects upwardly. The inner edge of the abutment 18 is juxtaposed with the outer edge of the abutment 16 as clearly seen in FIGURE 1. The shoulders 16 and 18 can conveniently be formed by a punching operation thus forming recesses in the opposite sides of the terminal end from which they protrude.

With reference to FIGURE 2, a portion of a wiper blade is shown including a channelled holder, or primary pressure applying means, 20 having a channel-shaped connector 22 pivotally connected thereto by transversely extending pin 24. The connector 22 comprises a body having a top wall 26, side walls 28 and spaced pairs of inwardly extending tabs 30 and 32 integral with the side walls. A leaf spring latch 34 is riveted at 36 to the top wall of the connector body, with the leaf spring being disposed between the top wall and the tabs 30 and 32. The leaf spring 34 is formed with a terminal stop portion 38, an adjacent fulcrum portion 40 adapted to engage the tabs 32, an upwardly inclined portion 42, a downwardly inclined portion 44 having a projecting tang 46, and a substantially flat outer end portion 48. The tang 46 is substantially aligned with a circular aperture 50 in the top wall 26 of the connector body.

Referring to FIGURE 3, the double lock terminal end wiper arm of FIGURE 1 is shown assembled with the connector of FIGURE 2, from which it can be seen that the shoulder 16 engages an edge of the aperture 50 in the connector body while the shoulder, or abutment, 18 is inwardly spaced from the tang 46 on the leaf spring 34. To assemble the arm of FIGURE 1 with the connector of FIGURE 2, it is only necessary to insert the free end thereof between the spring 34 and the bottom surface of the top wall 26 of the connector body and effect relative rectilinear movement therebetween. When the shoulder, or abutment, 16 is moved into alignment with the aperture 50, the leaf spring will effect engagement therebetween.

The arm can only be removed from the connector by manually depressing the outer end 48 of the leaf spring and simultaneously effecting relative rectilinear movement between the arm and the connector in the opposite direction. It is pointed out that mere pivotal movement, known in the art as breakaway, between the arm and the connector will not result in disengagement of the arm from the connector since while the shoulder 16 becomes disengaged from the aperture 50 by pivotal movement, the abutment 18 will engage the tang 46 to prevent separation of the arm and the blade connector. Thus, the problem alluded to hereinbefore of preventing inadvertent separation of the arm and the blade due to an accumulation of ice or other foreign matter between the connector body 22 and the holder 20 resulting in deflection of the leaf spring by the arm applied presusre will not be capable of releasing the double lock so as to permit separation of the blade and the arm.

While the embodiment of the invention as herein disclosed constitutes a preferred form, it is to be understood that other forms might be adopted.

What is claimed is as follows:

1. A wiper assembly including a bayonet connector adapted for pivotal connection to a wiper blade and a wiper arm having an elongate substantially flat terminal end portion adapted for releasable engagement with said connector, said connector comprising a channel-shaped member having a top wall with an aperture, spaced side walls and a leaf spring latch disposed between said side walls and having a tang aligned with the aperture in the top wall, said terminal end portion having a pair of longitudinally spaced oppositely projecting vertical shoulders, one of said shoulders being adapted for insertion into the aperture in the top wall of said connector, and the other of said shoulders being adapted to engage the tang on said spring latch so as to form a double lock releasable connection between the wiper arm and the connector.

2. A wiper assembly including a bayonet connector adapted for pivotal connection to a wiper blade and a wiper arm having an elongate substantially flat terminal end portion adapted for releasable engagement with said connector, said connector comprising a channel-shaped member having a top wall with an aperture therein, spaced side walls and a leaf spring latch disposed between said side walls and having a tang aligned with the aperture in the top wall, said terminal end portion having a pair of longitudinally spaced shoulders thereon, the outermost shoulder projecting vertically downward and the innermost shoulder projecting upward, said innermost shoulder being engageable with the aperture in the top wall of said connector and the outermost shoulder being engageable with the tang on said spring latch so as to form a double lock releasable connection between the wiper arm and the connector.

References Cited in the file of this patent
UNITED STATES PATENTS 2,915,770 Scinta _____ Dec. 8, 1959

FOREIGN PATENTS 184,361 Germany _____ May 1, 1907
1,023,025 France _____ Dec. 24, 1952
1,047,040 Germany _____ Dec. 18, 1958